(12) United States Patent
Hayashi

(10) Patent No.: US 6,796,801 B2
(45) Date of Patent: Sep. 28, 2004

(54) STRUCTURE OF CONNECTION BETWEEN STEERING ROLL CONNECTOR AND STEERING WHEEL

(75) Inventor: Hirofumi Hayashi, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 10/669,255

(22) Filed: Sep. 25, 2003

(65) Prior Publication Data

US 2004/0063347 A1 Apr. 1, 2004

(30) Foreign Application Priority Data

Sep. 26, 2002 (JP) ..................................... P. 2002-281061

(51) Int. Cl.[7] .............................................. H01R 39/00
(52) U.S. Cl. ........................................ 439/15; 439/164
(58) Field of Search ............................. 439/15, 164, 13

(56) References Cited

U.S. PATENT DOCUMENTS

| | | | | |
|---|---|---|---|---|
| 5,655,919 A | * | 8/1997 | Ishikawa et al. ............. | 439/164 |
| 5,841,069 A | * | 11/1998 | Nagaoka et al. .............. | 174/69 |
| 6,261,112 B1 | * | 7/2001 | Mitsui .......................... | 439/164 |
| 6,264,487 B1 | * | 7/2001 | Taniuchi et al. ............. | 439/164 |
| 6,341,969 B1 | * | 1/2002 | Taniuchi et al. ............. | 439/164 |
| 6,435,886 B2 | * | 8/2002 | Oguma ......................... | 439/164 |

FOREIGN PATENT DOCUMENTS

JP  2001-270446 A  10/2001

* cited by examiner

*Primary Examiner*—Ross Gushi
*Assistant Examiner*—X. Chung-Trans
(74) *Attorney, Agent, or Firm*—Morgan, Lewis & Bockius, LLP

(57) ABSTRACT

An escape groove (26), which is in the shape of an end-closed annulus having its center disposed on an axis of a steering shaft (1), is formed in an upper surface of a rotating case of a SRC (7). A convex portion (9) is formed on a bottom portion (3a) of a steering wheel (3), and the convex portion (9) is received in the escape groove (26). Even when the steering wheel (3) is operated or turned, the rotating case (16) will not rotate until the convex portion (9) abuts against a circumferential end of the escape groove (26). Therefore, the amount of movement of the rotating case (16) of the SRC (7) and hence the amount of movement of the flat cable (20) are reduced.

1 Claim, 3 Drawing Sheets

STRUCTURE OF CONNECTION BETWEEN STEERING ROLL CONNECTOR AND STEERING WHEEL

BACKGROUND OF THE INVENTION

This invention relates to a structure of connection between a reversed-type steering roll connector (hereinafter referred to as "SRC") and a steering wheel.

In vehicles, there has heretofore been used a SRC by which electrical equipments, mounted on a steering wheel (which is operated or turned), are electrically connected to electrical equipments mounted on a vehicle body. In one such conventional SRC, a flat cable is received in a spirally-wound condition in an annular receiving portion formed between a fixed case (stator) and a rotating case (rotator), and one end of this flat cable is connected to a connector portion on the fixed case, while the other end thereof is connected to a connector portion on the rotating case. In this case, the rotating case rotates together with the steering wheel (see, for example, JP2001-270446A).

In recent years, there have been extensively used so-called reversed-type SRCs in which the length of a flat cable can be reduced. In such a reversed-type SRC, a ring member is received within an annular receiving portion, formed between a fixed case and a rotating case, so as to move in a direction of the circumference of this receiving portion, and a plurality of rollers are rotatably mounted on this ring member, and are spaced from one another in the circumferential direction. A flat cable is received in this receiving portion in such a manner that the direction of winding of the flat cable is reversed by one of the plurality of rollers. In this construction, also, the rotating case rotates together with a steering wheel (see, for example, JP2001-165607A).

Although the above reversed-type SRC has an advantage that the length of the flat cable can be reduced, it has the following disadvantage. Namely, an intermediate portion of the flat cable is reversed into a generally U-shape, and therefore stresses are always exerted on this reversed portion of the flat cable. When the steering wheel is operated or turned, a pushing force and a pulling force act on the flat cable via the rotating case. Particularly when the steering wheel is turned or swung right and left, a pushing force and a pulling force repeatedly act on the flat cable, and as a result there was a fear that the durability of the flat cable was lowered.

SUMMARY OF THE INVENTION

This invention has been made in view of the above circumstances, and an object of the invention is to provide a structure of connection between a reversed-type SRC and a steering wheel, in which the durability of a flat cable of the SRC is enhanced.

In the invention, the above object has been achieved by a connecting structure for a vehicle comprising:
 a steering wheel connected to a distal end portion of a steering shaft;
 a reversed-type steering roll connector including,
  a fixed case fixed to a vehicle body of the vehicle,
  a rotating case rotatable with respect to the fixed case, which cooperates with the fixed case to form an annular receiving portion a center of which corresponds to the steering shaft,
  a ring member received in the receiving portion, movable in a direction of a circumference of the receiving portion,
  a plurality of circumferentially-spaced rollers rotatably mounted on the ring member, and
  a flat cable which is received in a spirally-wound condition in the receiving portion in such a manner that a reversed portion at which a direction of winding of the flat cable is reversed by one of the rollers is formed intermediate opposite ends of the flat cable, one of the opposite ends of the flat cable being connected to the fixed case while the other end thereof is connected to the rotating case;
 an escape groove having a shape of an end-closed annulus a center of which corresponds to the steering shaft, formed in one of the rotating case and the steering wheel; and
 a convex portion received in the escape groove, which is movable along the escape groove and is formed on the other of the rotating case and the steering wheel.

In the above construction, when the steering wheel is operated or turned, the convex portion, received in the escape groove, moves relative to this escape groove therealong. Within the range of movement of the convex portion in the escape groove, a rotating force of the steering wheel is not transmitted to the rotating case of the SRC, and therefore the rotating case does not rotate, and hence remains there. Then, when the convex portion abuts against an circumferential end of the escape groove, the rotating case rotates together with the steering wheel in the same direction. Therefore, even when the steering wheel is operated or turned, the rotating case will not rotate until the convex portion, received in the escape groove, abuts against the circumferential end of the escape groove, and therefore the amount of movement of the rotating case of the SRC and hence the amount of movement of the flat cable can be reduced. As a result, stresses, acting on the flat cable, can be reduced, so that the durability of the flat cable can be enhanced. And besides, since the amount of movement of the flat cable is reduced, the length of the flat cable can be further reduced.

DETAILED DESCRIPTION OF PREFERRED EMBODIMENTS

Figure 1:
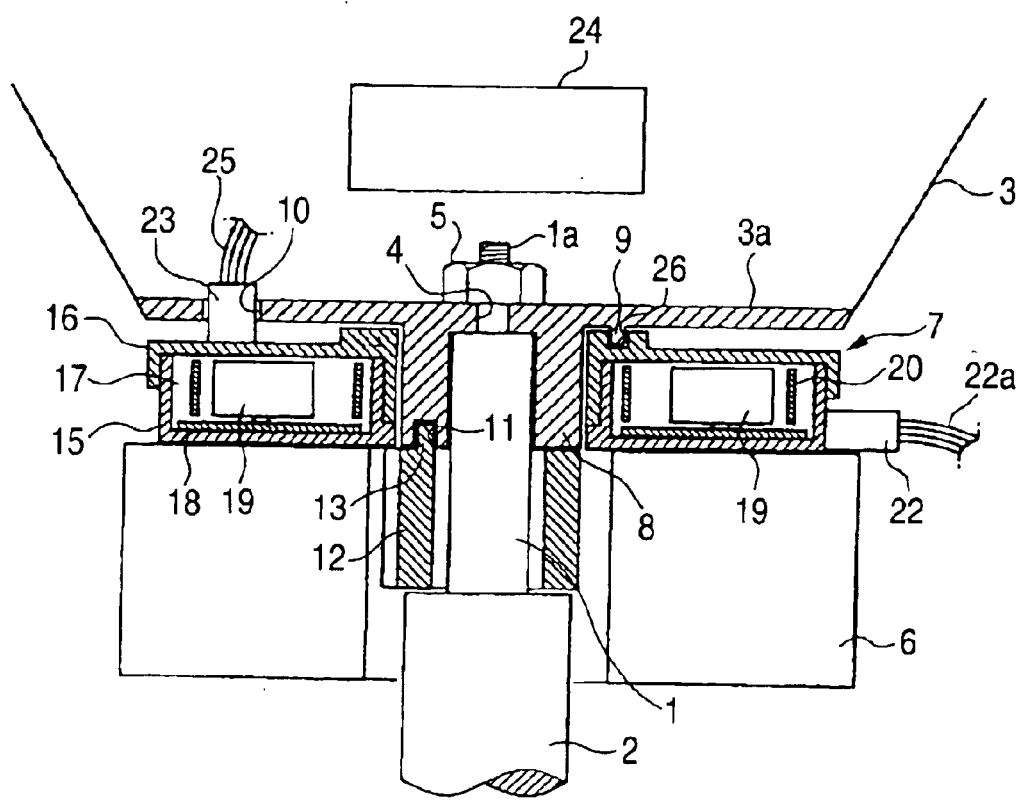
FIG. 1 is a vertical cross-sectional, front-elevational view showing one preferred embodiment of the present invention.

One preferred embodiment according to the present invention will now be described with reference to the drawings. In FIG. 1, a steering shaft 1 is passed through a column tube 2, and a threaded portion 1a formed at a distal end portion of the steering shaft 1 projecting from the column tube 2 is passed through a passage hole 4 formed through a bottom portion 3a of a steering wheel 3. A nut 5 is threaded on the threaded portion 1a, and by doing so, the steering wheel 3 is mounted on the distal end portion of the steering shaft 1 so as to rotate together with this steering shaft 1.

A switch base 6 for lever combination switches is mounted around the column tube 2 in a fixed condition. Therefore, this switch base 6 is fixed to a vehicle body of a vehicle. A reversed-type SRC (steering roll connector) 7 (described later) is provided between an upper surface of the switch base 6 and the steering wheel 3.

Figure 2:
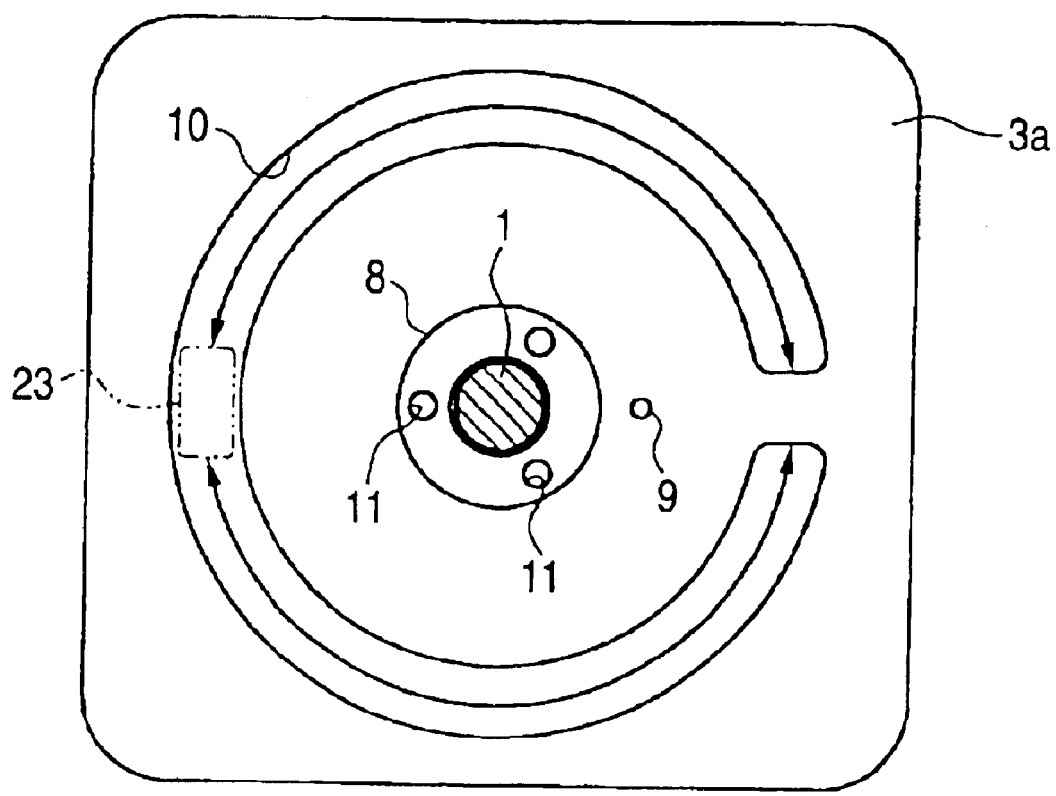
FIG. 2 is a bottom view of a steering wheel

As shown also in FIG. 2, a cylindrical portion 8 is formed on and projects downwardly from the bottom portion 3a of the steering wheel 3 in surrounding relation to the passage hole 4. A cylindrical convex portion 9 is formed on and projects downwardly from the bottom portion 3a, and is disposed adjacent to an outer peripheral surface of the cylindrical portion 8. An opening 10 is formed through the bottom portion 3a in surrounding relation to the cylindrical portion 8 except that portion of this bottom portion 3a corresponding to the convex portion 9. This opening 10 is in the shape of an end-closed annulus having its center disposed on the axis of the steering shaft 1. Three recesses 11 are formed in a lower end surface of the cylindrical portion 8, and engagement projections 13 formed on a cancel cam 12 of a cylindrical shape are inserted in these recesses 11, respectively. Therefore, the cancel cam 12 rotates together with the steering wheel 3.

Next, the SRC 7 will be described. The SRC 7 comprises a fixed case 15 of a cylindrical double-wall construction (having two cylindrical walls interconnected at their lower ends by a bottom wall), and a rotating case 16 which is rotatably mounted on the fixed case 15, and covers an open top of the fixed case 15. The fixed case 15 is fixedly secured to the switch base 6 by bolts (not shown). An annular receiving portion 17 is formed between the fixed case 15 and the rotating case 16, the annular receiving portion 17 having its center disposed at the axis of the steering shaft 1 (see FIG. 4).

Figure 4:
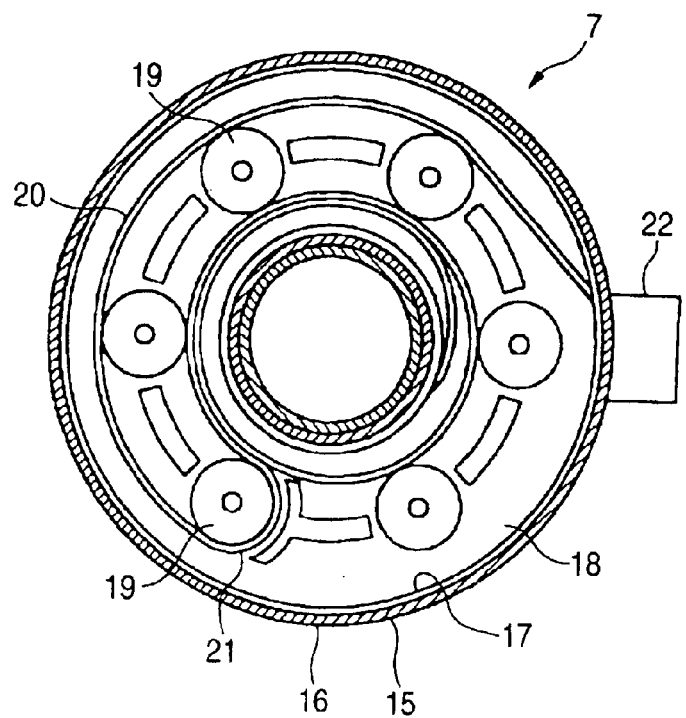
FIG. 4 is a horizontal cross-sectional, plan view of the SRC.

As shown in FIG. 4, a ring member 18 is received within the receiving portion 17 so as to move in a direction of the circumference of this receiving portion 17. A plurality of rollers 19 are rotatably mounted on the ring member 18, and are spaced from one another in the circumferential direction. A flexible flat cable 20 is received in a spirally-wound condition in the receiving portion 17 in such a manner that a reversed portion 21, at which the direction of winding of the flat cable 20 is reversed by one of the rollers 19, is formed at an intermediate portion of the flat cable 20. One end of the flat cable 20 is connected to a first connector portion 22 mounted on the fixed case 15, while the other end thereof is connected to a second connector portion 23 mounted on the upper surface of the rotating case 16.

Electrical equipments (not shown), mounted on the vehicle body, are connected to the first connector portion 22 via a cable 22a (see FIG. 1). The second connector portion 23 is received in the opening 10 in the steering wheel 3 so as to move relative to the opening 10 in the direction of the circumference of this opening 10. For example, an inflator (gas-producing device) 24 of an air bag and a horn switch (not shown), which are mounted on the steering wheel 3, are connected to the second connector portion 23 via a cable 25 (see FIG. 1) within the steering wheel 3.

Figure 3:
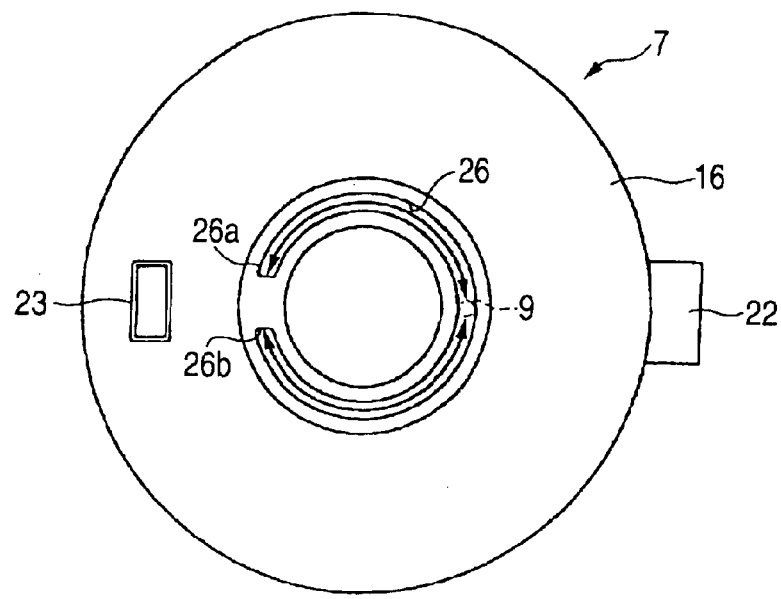
FIG. 3 is a plan view of a SRC.

As shown in FIG. 3, an escape groove 26, which is in the shape of an end-closed annulus having its center disposed on the axis of the steering shaft 1, is formed in that portion of the upper surface of the rotating case 16 corresponding to a path of movement of the convex portion 9. The convex portion 9 is received in this escape groove 26 so as to move therealong in the circumferential direction.

In the above construction, when the steering wheel 3 is operated or turned, the convex portion 9 received in the escape groove 26 moves along the groove (see FIG. 3). Within the range of movement of the convex portion 9 in the escape groove 26, a rotating force of the steering wheel 3 is not transmitted to the rotating case 16, and therefore the rotating case 16 does not rotate, and hence remains there. Then, when the convex portion 9 abuts against one end 26a or the other end 26b (which are circumferentially spaced from each other) of the escape groove 26, the rotating case 16 rotates together with the steering wheel 3 relative to the fixed case 15. In this case, the second connector portion 23 on the rotating case 16 is received in the opening 10 of the end-closed annular shape in the steering wheel 3, and therefore within the range of movement of the second connector portion 23 relative to the opening 10 (see FIG. 2), the rotating force of the steering wheel 3 is not transmitted to the rotating case 16.

Therefore, even when the steering wheel 3 is operated or turned, the rotating case 16 will not rotate until the convex portion 9 received in the escape groove 26 abuts against the one end 26a or the other end 26b of the escape groove 26, and therefore the amount of movement of the rotating case 16 and hence the amount of movement of the flat cable 20 can be reduced. Particularly when the steering wheel 3 is operated to be swung within one rotation, the rotating case 16 hardly rotates, and therefore the amount of movement of the flat cable 20 is small. As a result, stresses acting on the flat cable 20 are reduced, so that the durability of the flat cable 20 is enhanced. And besides, since the amount of movement of the flat cable 20 is reduced, the length of the flat cable 20 can be further reduced.

The present invention is not limited to the above embodiment, the following modification or change can be made.

In the above embodiment, although the convex portion 9 is formed on the steering wheel 3 while the escape groove 26 is formed in the rotating case 16, there can be adopted a reverse construction in which the escape groove 26 is formed in the steering wheel 3 while the convex portion 9 is formed on the rotating case 16.

As is clear from the foregoing description, in the present invention, even when the steering wheel is operated or turned, the rotating case of the SRC will not rotate until the convex portion, received in the escape groove, abuts against the circumferential end of the escape groove. Therefore, the amount of movement of the rotating case and hence the amount of movement of the flat cable is reduced. Therefore, the durability of the flat cable can be enhanced, and also the length of the flat cable can be further reduced.

What is claimed is:

1. A connecting structure for a vehicle comprising:
   a steering wheel connected to a distal end portion of a steering shaft;
   a reversed-type steering roll connector including,
      a fixed case fixed to a vehicle body of the vehicle,
      a rotating case rotatable with respect to the fixed case, which cooperates with the fixed case to form an annular receiving portion a center of which corresponds to the steering shaft,
      a ring member received in the receiving portion, movable in a direction of a circumference of the receiving portion,
      a plurality of circumferentially-spaced rollers rotatably mounted on the ring member, and
      a flat cable which is received in a spirally-wound condition in the receiving portion in such a manner that a reversed portion at which a direction of winding of the flat cable is reversed by one of the rollers is formed intermediate opposite ends of the flat cable, one of the opposite ends of the flat cable being connected to the fixed case while the other end thereof is connected to the rotating case;
   an escape groove having a shape of an end-closed annulus a center of which corresponds to the steering shaft, formed in one of the rotating case and the steering wheel; and
   a convex portion received in the escape groove, which is movable along the escape groove and is formed on the other of the rotating case and the steering wheel.

* * * * *